Jan. 24, 1956     J. S. HACKNEY     2,731,809

ICE CREAM MAKING APPARATUS

Filed April 11, 1952     3 Sheets-Sheet 1

INVENTOR
JAMES S. HACKNEY

BY *Gustove Miller*

ATTORNEY

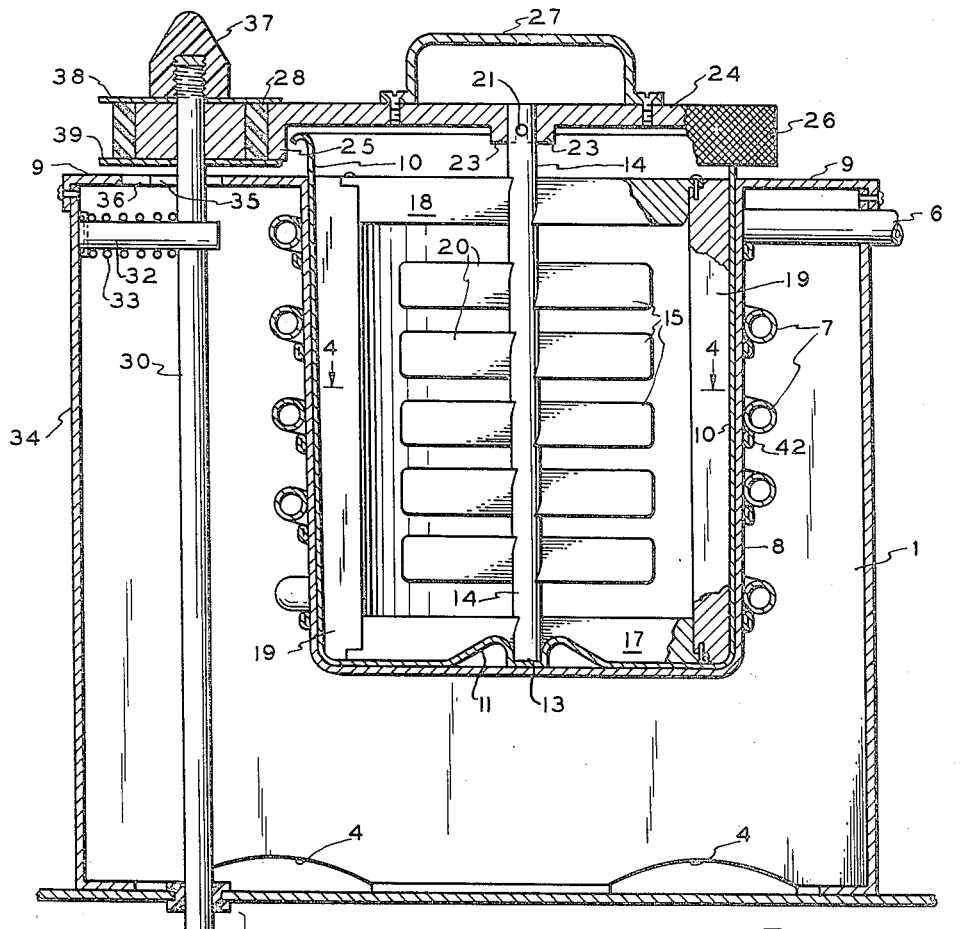
Fig. 2
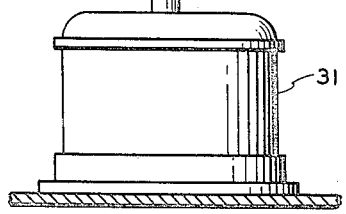
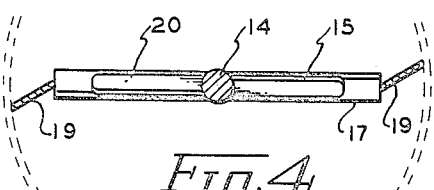
Fig. 3
Fig. 4
INVENTOR
JAMES S. HACKNEY
BY Gustave Miller
ATTORNEY

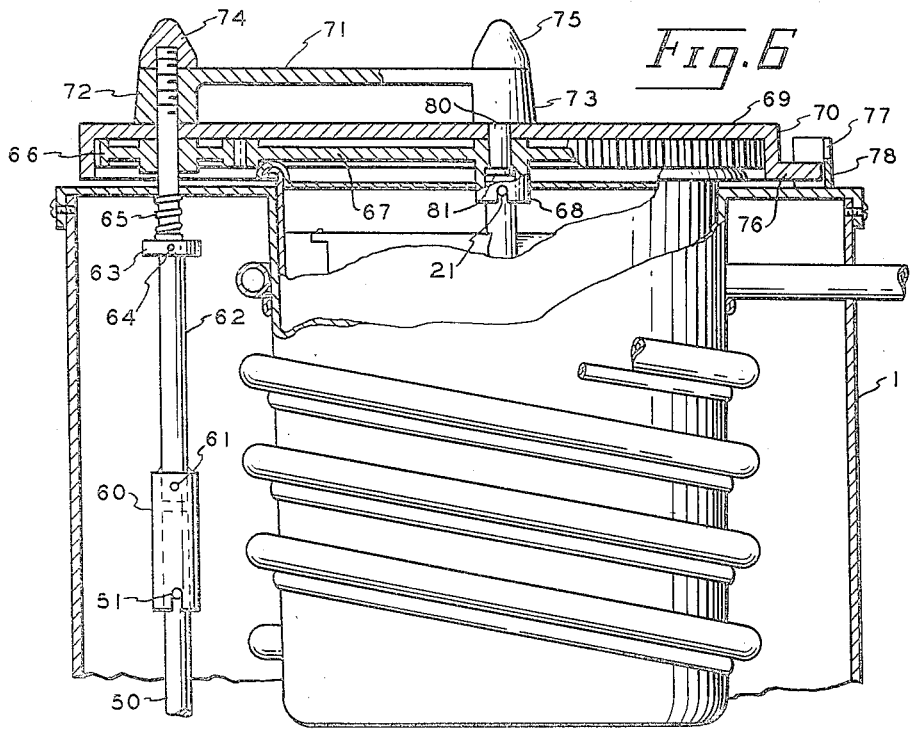
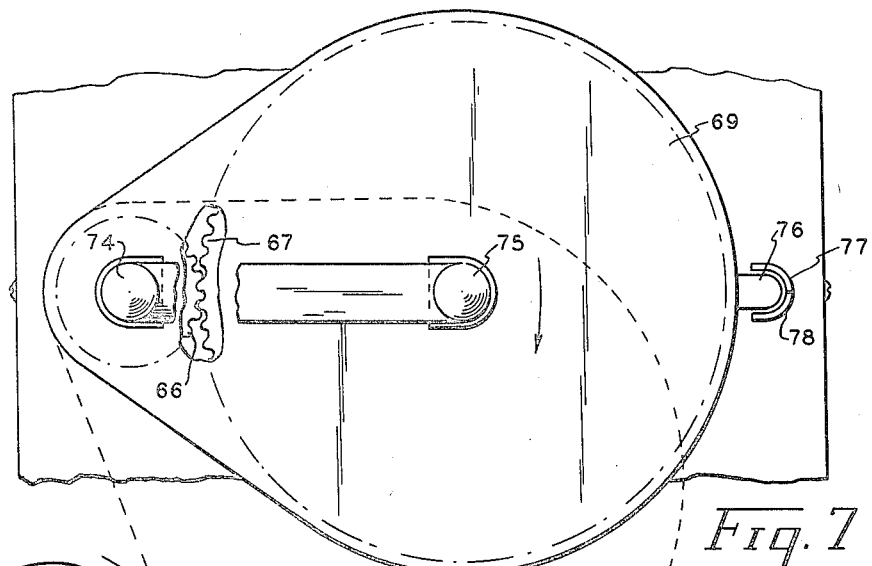
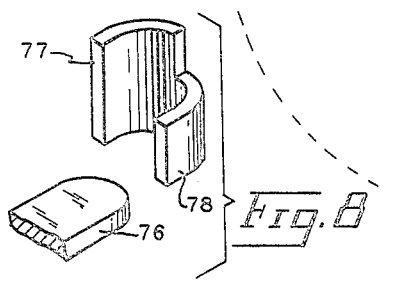
INVENTOR
JAMES S. HACKNEY
BY Gustave Miller
ATTORNEY

2,731,809
ICE CREAM MAKING APPARATUS

James S. Hackney, Los Angeles, Calif.

Application April 11, 1952, Serial No. 281,761

11 Claims. (Cl. 62—114)

This invention relates to apparatus for making ice cream, and more particularly to apparatus for making ice cream quickly and conveniently in small quantities for use in homes, hotels, restaurants, and the like.

Heretofore, the making of ice cream in small quantities has been inconvenient and expensive; and quantities which are not immediately consumed must be stored for future use. However, with the advent of improved refrigerating apparatus, ice cream can be quickly made and conveniently stored by means of the apparatus hereinafter described.

It is, therefore an object of this invention to provide a simple an effective apparatus arranged to be used in combination with a refrigerating unit for quickly and conveniently making ice cream in small quantities at a low cost.

A further object is to provide an ice cream making apparatus which can be readily attached to a refrigerating unit with slight alterations.

A further object is to provide defrosting means to facilitate the removal of ice cream containers from the apparatus.

These and other objects are attained by the novel construction and arrangement of parts hereinafter described and illustrated by the accompanying drawings, forming a part hereof, and in which:

Fig. 2 is a sectional view taken on the line 2—2 of Fig. 1.

Fig. 3 is a perspective of means to facilitate the removal of the apparatus.

Fig. 4 is a sectional view taken on the line 4—4 of Fig. 2.

Fig. 6 is an elevational view, partly in section of a modified form of the invention.

Fig. 7 is a plan view of the modified form of the invention.

Fig. 8 is a perspective view of stop means for holding the cover in the modified form in a definite position.

Figure 1:
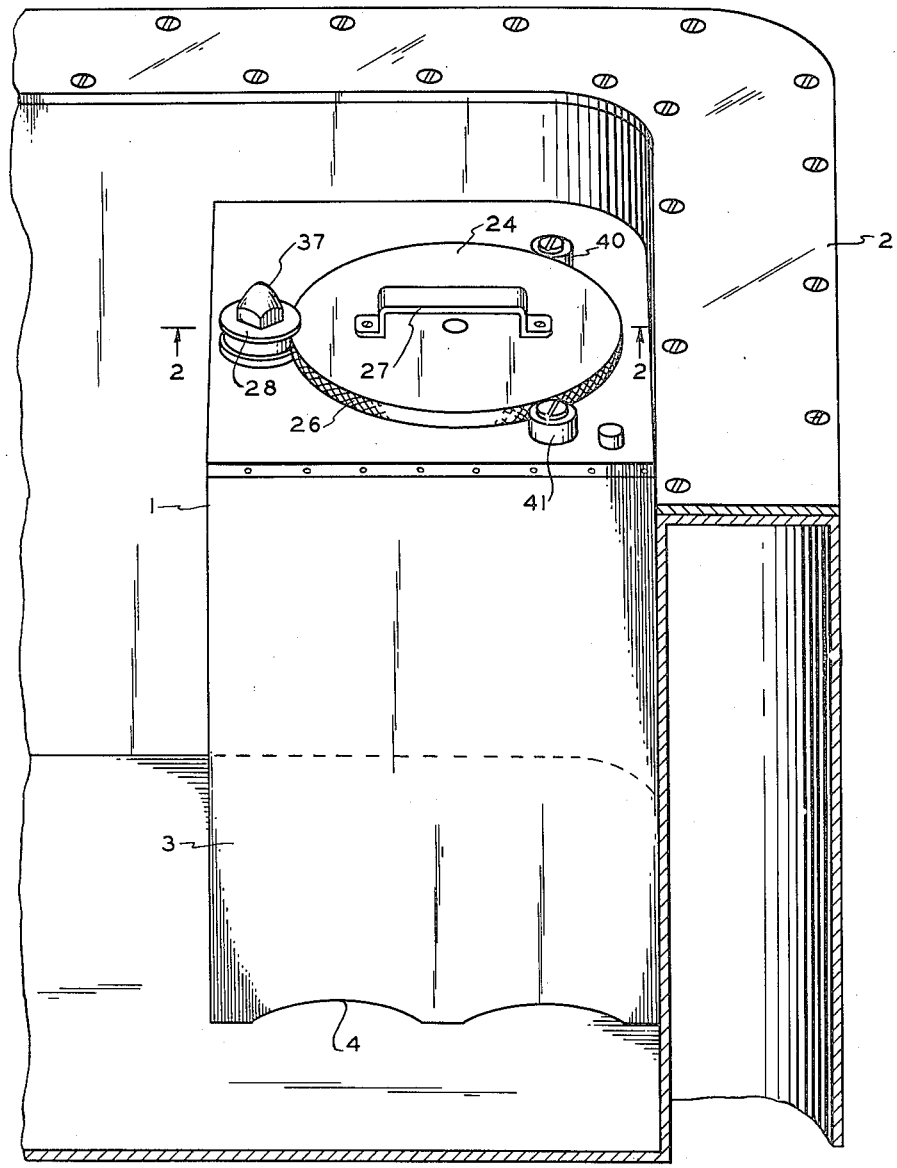
Fig. 1 is a perspective view of an apparatus embodying the invention.
Figure 5:
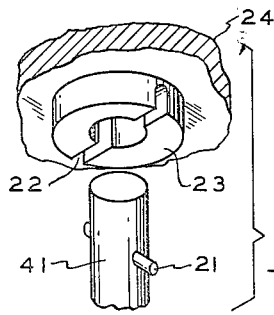
Fig. 5 is a perspective view of means for connecting a cover plate to a shaft.

Referring to the drawings, in Fig. 1, the ice cream making apparatus is shown to comprise a casing 1 positioned in a refrigerating unit 2, said casing 1 having a side wall 3 provided with openings 4 for draining collected moisture from the casing when defrosting.

The refrigerating unit is refrigerated by any suitable refrigerant such as gas, brine, or the like, circulating in a tube 6 which is extended by coils 7 encircling a can 8 having a flange 9 attached to casing 1. (See Fig. 2.)

Positioned in the can 8 is a container 10 for the ice cream mix. The bottom of the container has a circular rib 11 providing a bearing 13 for the lower end of the vertical shaft 14. Secured to shaft 14 are lower and upper cross arms 17 and 18, to which are attached angularly directed vanes 19 for scraping ice cream from the wall of container 10. (See Fig. 4.) The cross arm 17 has its lower edge cut out to conform to the shape of the rib 11, to assist in stabilizing the agitating apparatus.

Attached to shaft 14 are a plurality of paddles 15 and 20 for agitating the ice cream mix. On one side of the vertical shaft 14 the paddles 15 are inclined in one direction relative to the shaft 14, and on the other side of the shaft 14 the paddles 20 are inclined in an opposite direction, thus providing a propeller effect. (See Fig. 4.) The upper end of shaft 14 has passing therethrough a pin 21 which is positioned in a slot 22 in a collar 23 projecting from the under side of a cover 24 having on its upper side a handle 27. The cover 24 has a downwardly extending flange 25 with a knurled surface 26.

The knurled flange 25 bears against a rubber tire 28 attached to a collar 29 fixed to a shaft 30, which extends through the bottoms of casing 1 and refrigerating unit 2 to a motor 31. The shaft 30 is positioned between guide bars 32 which are encircled by a spring 33 bearing against the shaft 30 and a wall 34 of casing 1 to hold the shaft snugly in a slot 35 in flange 9. (See Fig. 3.) The slot 35 is connected to an angularly directed slot 36 into which the shaft 30 can be moved by means of a knob 37 to remove the pressure of tire 28 on flange 26, to enable removal of the cover 24. The shaft 30 has attached thereto discs 38, 39 above and below collar 29 and extending over the knurled flange 26 for guide purposes. The cover 24 is maintained in alinement by means of spaced bearings 40, 41 mounted on the flange 9.

In operation, the motor drives shaft 30 to rotate the cover 24 to cause paddles 20 to agitate the ice cream mix. When the ice cream is sufficiently congealed, the shaft 30 is moved into slot 36 and the cover 24 is removed. The container 10 may then be removed from the can 8. To facilitate the removal of the container 10, the coils 7 are in contact with electrical heating coils 42, which, when a switch is closed to pass current through them, defrost the coils 7 to enable easy removal of the container 10 from can 8. The container 10 and can 8 are also tapered downwardly to facilitate removal.

A timer switch is used to turn on the motor for a predetermined time for mixing purposes; and a circuit breaker is used in the motor circuit to prevent undue force on the motor in case of an overload. An overload is indicated by an audible or visual signal, such as a red light. A temperature control is cut out during the time freezing is going on, thus keeping the compressor of the refrigerating unit running until the time switch cuts off the motor.

The above apparatus is designed to freeze about one-half gallon of ice cream in 10 to 15 minutes. When larger quantities are desired, such as 5 or 10 gallons, the structure of the modification hereinafter described is used.

In the modification in Figs. 6, 7, 8, the structure of can 8, container 10, and the paddles and vanes, as above described, are the same.

Referring to Fig. 6, the vertical shaft 50 is connected to a motor, and has a pin 51 passing therethrough, the pin 51 being in a slot in a sleeve 60, fixed by means of a pin 61, to a stub shaft 62, to which is attached a collar 63 by means of pin 64. A coiled spring 65 encircles shaft 62 and bears against the collar 63 and the flange 9. Above the flange 9, there is fixed to the shaft 62 a small gear 66 in mesh with a larger gear flange of a container cover 67, which has on its under side a slotted collar 68 engaging the pin 21 on shaft 14. The gears 66 and 67 are encased in an overall cover 69 having a flange 70 from which projects a lug 76 arranged to enter a semi-cylindrical stop 77 having one side cut away as shown at 78, so that the lug 76, when raised above the portion 78, can be removed from the stop.

A handle 71 has bearings 72 and 73 for the upper ends of shaft 62 and stub shaft 80, respectively. The handle is held tightly against the cover 69 by knobs 74 and 75 threadedly engaging the ends of shafts 62 and 80. The stub shaft 80 has a flange 81 at its lower end so that when the cover 69 is raised by means of the handle 71, the large gear 67 will move upward also. The lug 76 having been moved from the stop 77, the cover 69 and gear 67 can be swung to one side pivoting on shaft 62, which moves upwardly slightly against the action of spring 65. The container 10 can now be readily removed.

From the above description, it will be seen that there has been provided a simple and inexpensive apparatus of making ice cream quickly and conveniently at low cost in relatively small quantities. The apparatus can be readily used in any type of refrigerating unit producing the necessary degree of temperature.

While the device has been shown and the structure described in detail, it is obvious that this invention is not to be considered as being limited to the exact form disclosed, and that changes in detail and construction may be made therein within the scope of what is claimed, without departing from the spirit of this invention.

The invention having been described, what is claimed is:

1. In combination with a refrigerating unit having refrigerant circulating tubes, an apparatus for making ice cream comprising a casing supported by the unit, a can mounted in the casing, means for extending the tubes around the can, an ice cream container removably positioned in the can, a vertical shaft removably supported by a central annular upstanding bearing in the bottom of the container, a plurality of paddles mounted on the shaft, a pair of cross arms mounted on the shaft, scraping vanes mounted on the cross arms, and means to rotate the shaft including a cover, said cover being removably attached to said vertical shaft.

2. The structure set forth in claim 1 further characterized by electrical heating means encircling the can and positioned adjacent the tubes to defrost the tubes and can to facilitate the removal of the container.

3. The structure set forth in claim 1 further characterized by said can and container being both tapered similarly to facilitate removal of the container.

4. In an apparatus for making ice cream, a container, a shaft supported by the container, agitating means mounted on the shaft, a cover, means for connecting the cover to the shaft, said cover having a flange, a second shaft, cover flange engaging means fixed to the second shaft and engaging the flange, and means to rotate the second shaft to thereby rotate said cover and said first shaft and the agitating means rotated thereby.

5. The structure of claim 4 further characterized by a can having a flange, said container being mounted in the can, said flange having a slot with angularly directed portion, said second shaft passing through the slot, spring means to normally urge the second shaft to a definite position in the slot to cause the cover flange engaging means to engage the flange on the cover, and means to move the second shaft into the angularly directed portion of the slot against the action of the spring means to disengage the cover flange engaging means from the flange on the cover.

6. The structure set forth in claim 4 further characterized by said cover flange having a circumferential knurled surface and said cover flange engaging means comprising a rubber tire mounted for rotation with said second shaft and circumferentially extending guide discs between which said rubber tire is located, said guide discs maintaining said rubber tire in cover flange engaging position.

7. The structure set forth in claim 4 further characterized by said cover flange having a large circumferential gear surface thereabout and said cover flange engaging means comprising a small gear mounted on said shaft.

8. In an ice cream making apparatus, a container for ice cream, agitating means mounted in the container, a cover for the container, said cover having a circumferential flange, a shaft, cover flange engaging means mounted on the shaft and engaging the flange on the cover, means connecting the cover with the agitating means, and means for rotating the shaft to thereby rotate said cover and said first shaft and the agitating means rotated thereby.

9. The structure set forth in claim 8 further characterized by the shaft passing through a slot, spring means to normally hold the shaft in a definite position in the slot to cause the cover flange engaging means to engage the flange, and means to move the shaft to another position in the slot to disengage the cover flange engaging means and the flange.

10. In an apparatus for making ice cream, a container, a first shaft mounted in the container, agitating means supported by the first shaft, a large gear detachably connected to the first shaft, a second shaft, a small gear attached to the second shaft and engaging the large gear, means to rotate the second shaft, a cover for the gears, stop means to hold the cover in a definite position, and means to lift the large gear and cover together.

11. The structure set forth in claim 10 further characterized by said stop means comprising a lug projecting from the cover and a semi-cylindrical member arranged to receive the lug, said member having one side lower than the other so that the lug can be removed from the member when the cover is lifted and rotated in one direction.

References Cited in the file of this patent

UNITED STATES PATENTS

| | | |
|---|---|---|
| 1,220,903 | Stemple | Mar. 27, 1917 |
| 1,819,324 | Fleece | Aug. 18, 1931 |
| 1,956,622 | Parker | May 1, 1934 |
| 2,194,719 | Parrish | Mar. 26, 1940 |
| 2,252,043 | Sissel | Aug. 12, 1941 |
| 2,306,602 | Harrington | Dec. 29, 1942 |
| 2,608,833 | Woodruff | Sept. 2, 1952 |